UNITED STATES PATENT OFFICE.

GEORGE W. MILES, OF BELMONT, MASSACHUSETTS, ASSIGNOR TO EASTMAN KODAK COMPANY, OF ROCHESTER, NEW YORK, A CORPORATION OF NEW YORK.

PROCESS OF RECOVERING PARTIALLY-HYDRATED CELLULOSE ESTERS FROM PHOTOGRAPHIC FILMS.

1,196,799. Specification of Letters Patent. Patented Sept. 5, 1916.

No Drawing. Application filed March 27, 1914. Serial No. 827,716.

*To all whom it may concern:*

Be it known that I, GEORGE W. MILES, a citizen of the United States, residing at Belmont, county of Middlesex, and State of Massachusetts, have invented certain new and useful Improvements in Processes of Recovering Partially-Hydrated Cellulose Esters from Photographic Films, fully described and represented in the following specification.

My invention relates to the treatment of films composed of cellulose derivatives, particularly the cellulose derivative described and claimed in Letters Patent of the United States No. 838,350, granted to me December 11, 1906, of which a characteristic example is: a partially hydrated cellulose acetate.

One object of my invention is to recover readily and inexpensively and in useful form, such an acetate which comprises in part a photographic film, for instance, a moving picture film which is defective or has become worn out. Photographic films of this character carry a film of gelatin or glue closely adhering to the cellulose acetate ribbon and in order to utilize the acetate for the manufacture of new films or ribbons, the acetate ribbon and glue film must be completely separated.

I recover the partially hydrated cellulose acetate, and in the case of a photographic film accomplish this separation from the glue film by means of a solvent composed of benzol and any of the ordinary commercial alcohols, such as denatured alcohol or wood alcohol, the benzol and alcohol being mixed in about equal proportions by volume. I heat this liquid mixture preferably to about 60° C. (and not over the boiling point of the liquid) with the photographic films, composed for example of a ribbon of partially hydrated cellulose acetate and an adherent film of glue. The cellulose derivative goes into solution leaving the glue film undissolved. This glue film, being heavier than the liquid, and now unattached to the cellulose ester, tends to settle to the bottom of the vessel if not disturbed, where it forms a more or less coherent mass which may, if desired, be further manipulated as by rolling it up into a ball and then separated from the solution. The glue may be removed by various well known methods as filtering, settling or decanting, the solution being in the ordinary case the only part that it is necessary to preserve. I then cool the solution, when the cellulose derivative precipitates. If the total quantity of glue has not been removed in the previous operation, so that some remains either entrained by the liquid and precipitate or dissolved in the solvent, further purification is necessary. If convenient, at this stage, a part of the glue which remains as for example on the vessel walls or as small particles in the liquid, may be mechanically removed, especially where coherent masses are present and can be easily lifted out or otherwise separated from the solution. The greater bulk of the liquid is then expressed from the precipitate in a filter press. The remainder of the solvent which is retained in contact with the precipitated partially hydrated cellulose acetate, I may then recover by any ordinary method such as distillation.

Subsequent washing of the precipitated cellulose derivative in water will remove any trace or remainder of the glue which may have been dissolved in the solution or which in any way remains with the precipitate. This leaves the partially hydrated acetate in perfect condition to be placed in solution for the purpose of manufacturing films.

As a quick and effective method of carrying out my invention, I separate the cellulose esters from the glue by filtering the solution while it is still warm enough to hold the esters in solution, thus removing all the glue except that which may have been dissolved. I thereafter precipitate the esters by cooling and separate the precipitate from the solvent and otherwise further treat it as above described.

A characteristic of partially hydrated cellulose acetate such as described in my patent aforesaid, is that it becomes plastic in the ordinary alcohols (including glycerin) at elevated temperatures and it is believed that the addition of benzol to alcohol enables a complete solution of the partially hydrated cellulose acetate to be made; in other words that it assists the alcohol to complete the work which the alcohol alone can only partially accomplish.

What I claim and desire to secure by Letters Patent is:

1. The process of recovering partially hydrated cellulose acetate from films having a colloidal material associated therewith, which consists in dissolving the acetate in a mixture composed of benzol and alcohol, removing the undissolved colloidal material from the solution, cooling the solution until the partially hydrated cellulose acetate precipitates and separating the precipitate from the solvent.

2. The process of removing partially hydrated cellulose acetate from photographic films, comprising said cellulose derivative and an adherent glue, which consists in dissolving the cellulose derivative in a mixture of benzol and alcohol leaving the glue substantially undissolved, isolating the cellulose derivative from the undissolved glue, cooling the solution and thereby precipitating the cellulose derivative and recovering the precipitate.

3. The process of recovering partially hydrated cellulose acetate from photographic films which comprise said cellulose derivative and an adherent glue, which consists in dissolving the cellulose derivative in a hot mixture of benzol and alcohol, leaving the glue substantially undissolved, filtering the solution while hot to remove the glue therefrom, cooling the solution and precipitating out the cellulose derivative recovering the solvent from the precipitate and washing the precipitate with water to remove any traces of glue that remain.

In testimony whereof, I have hereunto set my hand, in the presence of two subscribing witnesses.

GEORGE W. MILES.

Witnesses:
J. A. GRAVES,
ALBERT E. PARKER.